US012724527B2

(12) United States Patent
Gray et al.

(10) Patent No.: US 12,724,527 B2

(45) Date of Patent: Sep. 1, 2026

(54) DOCUMENT-CENTRIC INTERFACE FOR INTERACTION WITH AI PROCESSING SYSTEMS

(71) Applicant: Wolfram Research, Inc., Champaign, IL (US)

(72) Inventors: Theodore Gray, Urbana, IL (US); Richard Hennigan, Manchester, NH (US); Connor Gray, Champaign, IL (US); Stephen Wolfram, Concord, MA (US)

(73) Assignee: Wolfram Group LLC, Champaign, IL (US)

( * ) Notice: Subject to any disclaimer, the term of this patent is extended or adjusted under 35 U.S.C. 154(b) by 306 days.

(21) Appl. No.: 18/656,493

(22) Filed: May 6, 2024

(65) Prior Publication Data

US 2024/0370142 A1 Nov. 7, 2024

Related U.S. Application Data

(60) Provisional application No. 63/464,101, filed on May 4, 2023.

(51) Int. Cl.
*G06F 3/0484* (2022.01)
*G06F 9/54* (2006.01)
(Continued)

(52) U.S. Cl.
CPC .............. *G06F 3/0484* (2013.01); *G06F 9/54* (2013.01); *G06F 40/166* (2020.01); *G06F 40/56* (2020.01); *G06F 2203/04803* (2013.01)

(58) Field of Classification Search
CPC ........ G06F 3/0484; G06F 9/54; G06F 40/166; G06F 40/56; G06F 2203/04803; G06N 20/00; G06N 3/10
See application file for complete search history.

(56) References Cited

U.S. PATENT DOCUMENTS 8,407,580 B2 3/2013 Gray et al.
8,413,116 B2 4/2013 Gray
(Continued)

OTHER PUBLICATIONS

Anonymous: "python—How to save a jupyter notebook with outputs—Stack Overflow" Jun. 9, 2020, XP093184338, Retrieved from the Internet:URL:https://stackoverflow.com/questions/62288996/how-to-save-a-jupyternotebook-with-outputs (2 pages).
(Continued)

*Primary Examiner* — Irete F Ehichioya
*Assistant Examiner* — Phoebe X Pan
(74) *Attorney, Agent, or Firm* — Lempia Summerfield Katz LLC

(57) ABSTRACT

A user interface (e.g., a computer-executed software program) is provided for interacting with an artificial intelligence (AI) processing system. The user interface allows a user to enter into a document user input, submit the user input to the AI processing system, and display within the document results received from the AI processing system. Thus, the user interface records an interaction and/or a processing history with the AI processing system. Additionally, the user interface provides mechanisms that permit a user to edit contents of the document and thus edit the interaction/processing history. The user interface allows the user to submit the edited interaction/processing history to the AI processing system to prompt the AI processing system to generate additional results. The user input received and stored in the document by the notebook interface optionally may include one or more of text, numerical data, mathematical formulae, computer software code, images.

18 Claims, 9 Drawing Sheets

(51) Int. Cl.
*G06F 40/166* (2020.01)
*G06F 40/56* (2020.01)

(56) References Cited

U.S. PATENT DOCUMENTS

| | | | | |
|---|---|---|---|---|
| 8,589,869 | B2 * | 11/2013 | Wolfram | G06F 8/30 707/723 |
| 8,788,524 | B1 | 7/2014 | Wolfram et al. | |
| 9,594,737 | B2 | 3/2017 | Wolfram | |
| 9,734,252 | B2 | 8/2017 | Wolfram et al. | |
| 9,933,861 | B2 | 4/2018 | Wolfram et al. | |
| 10,055,468 | B2 | 8/2018 | Wolfram et al. | |
| 10,095,691 | B2 | 10/2018 | Wolfram | |
| 10,366,149 | B2 | 7/2019 | Wolfram et al. | |
| 10,762,285 | B2 | 9/2020 | Wolfram et al. | |
| 10,929,105 | B2 | 2/2021 | Wolfram et al. | |
| 12,118,296 | B2 * | 10/2024 | Wilde | H04L 65/4015 |
| 2013/0125094 | A1 | 5/2013 | Wolfram et al. | |
| 2015/0363513 | A1 | 12/2015 | Cassel et al. | |
| 2016/0026438 | A1 | 1/2016 | Wolfram | |
| 2019/0213465 | A1 * | 7/2019 | Avrahami | G10L 15/197 |
| 2022/0358286 | A1 * | 11/2022 | Wilson-Thomas | G06F 3/0482 |
| 2024/0303415 | A1 * | 9/2024 | Wilde | G06F 40/56 |
| 2024/0311576 | A1 * | 9/2024 | Mikutel | G06F 3/0484 |
| 2024/0419465 | A1 * | 12/2024 | Riscutia | G06F 9/453 |
| 2025/0110786 | A1 * | 4/2025 | Schrader | G06F 9/54 |
| 2025/0191481 | A1 * | 6/2025 | Gray | G09B 7/02 |
| 2025/0298500 | A1 * | 9/2025 | Horvitz | G06F 3/04817 |
| 2025/0298972 | A1 * | 9/2025 | Edwards | G06F 40/20 |

OTHER PUBLICATIONS

International Search Report and Written Opinion for PCT Application No. PCT/US2024/028060, mailed Jul. 29, 2024. (12 pages).

* cited by examiner

AI Processing System 128

Network 198

Server 164

Processor 168

Memory 172

Input 176

Display 180

Network Interface 184

188

User Interface Application 140

Network 154

Computer 102

DOCUMENT-CENTRIC INTERFACE FOR INTERACTION WITH AI PROCESSING SYSTEMS

CROSS-REFERENCES TO RELATED APPLICATIONS

This application claims the benefit of U.S. Provisional Application No. 63/464,101, entitled "Document-Centric Interface for Interaction with AI Processing Systems," filed on May 4, 2023, which is hereby incorporated by reference in its entirety.

FIELD OF THE DISCLOSURE

The present disclosure generally relates to user interfaces, and more particularly, user interfaces for interacting with artificial intelligence processing systems.

BACKGROUND

A typical user interface, in the context of a computer system, is a computer software-implemented component that allows a user (e.g., a person) to enter text, images, computer software code, mathematical formulas, etc., for processing by a computer processing system and/or for electronic storage. Typical user interfaces can also receive and display output from the computer processing system, or retrieve and display previously stored data.

A "glass teletype" interface is a computer interface program that displays an interaction or processing history in an immutable form that mimics the immutable nature of a paper record printed by a teletype machine. Glass teletype interfaces are common in human-to-human chat records (for example text messaging and social media applications), where they record events as they have happened. The record of events as recorded by the glass teletype interface cannot be changed, except perhaps by deletion.

An artificial intelligence (AI) processing system is a computer processing system which accepts user input, processes the user input according to an artificial intelligence algorithm, and then generates an output based on the processing of the user input. Examples of AI processing systems include AI chat bots, Large Language Model (LLM) prompt/response systems, neural network systems, AI image generating systems, AI image processing systems, AI-based computation and information processing systems, etc.

AI processing systems are traditionally deployed through glass teletype interfaces in which the history of interactions is fixed and cannot be modified by the user.

SUMMARY OF THE DISCLOSURE

In an embodiment, a method for interacting with an artificial intelligence (AI) computer processing system that processes information according to an AI algorithm is disclosed. The method includes: receiving, at one or more computer processors, a first user input to be processed by the AI computer processing system; in response to receiving the first user input, prompting, by the one or more computer processors, a display device to display the first user input in the workspace document; generating, at the one or more computer processors, a first application programming interface (API) call that includes the first user input, the first API call configured to prompt the AI computer processing system to process the first user input according to the AI algorithm; prompting, by the one or more computer processors, a network interface to send the first API call to the AI computer processing system; receiving, at the one or more computer processors, a first result from the AI computer processing system, the first result corresponding to a processing of the first user input by the AI computer processing system according to the AI algorithm, wherein receiving the first result is responsive to the network interface sending the first API call to the AI computer processing system; in response to receiving the first result, prompting, by the one or more computer processors, the display device to display the first result in the workspace document while displaying the first user input in the workspace document; after receiving the first result, receiving, at one or more computer processors, a second user input that corresponds to a modification of at least one of i) the first user input, and ii) the first result; in response to receiving the second user input, modifying in the workspace document, by the one or more computer processors, the one or both of i) the first user input and ii) the first result according to the second user input to generate one or both of i) a modified first user input and ii) a modified first result, and prompting, by the one or more computer processors, the display device to display the one or both of i) the modified first user input and ii) the modified first result in the workspace document; generating, at the one or more computer processors, a second API call that includes the one or both of i) the modified first user input and ii) the modified first result, the second API call configured to prompt the AI computer processing system to process the one or both of i) the modified first user input and ii) the modified first result according to the AI algorithm; prompting, by the one or more computer processors, the network interface to send the second API call to the AI computer processing system; receiving, at the one or more computer processors, a second result from the AI computer processing system, the second result corresponding to a processing of the one or both of i) the modified first user input and ii) the modified first result by the AI computer processing system according to the AI algorithm, wherein receiving the second result is responsive to the network interface sending the second API call to the AI computer processing system; and in response to receiving the second result, prompting, by the one or more computer processors, the display device to display the second result in the workspace document.

In another embodiment, a computer for interacting with an artificial intelligence (AI) computer processing system that processes information according to an AI algorithm is disclosed. The computer comprises: one or more computer processors; and one or more memories coupled to the one or more computer processors. The one or more memories storing machine readable instructions that, when executed by the one or more processors, cause the one or more processors to: receive a first user input to be processed by the AI computer processing system; in response to receiving the first user input, prompt a display device to display the first user input in the workspace document; generate a first application programming interface (API) call that includes the first user input, the first API call configured to prompt the AI computer processing system to process the first user input according to the AI algorithm; prompt a network interface to send the first API call to the AI computer processing system; receive a first result from the AI computer processing system, the first result corresponding to a processing of the first user input by the AI computer processing system according to the AI algorithm, wherein receiving the first result is responsive to the network interface sending the first API call to the AI computer processing system; in response to receiving the first result, prompt the display device to display the first result in the workspace document while displaying the first user input in the workspace document; after receiving the first result, receive a second user input that corresponds to a modification of at least one of i) the first user input, and ii) the first result; in response to receiving the second user input, modify in the workspace document the one or both of i) the first user input and ii) the first result according to the second user input to generate one or both of i) a modified first user input and ii) a modified first result, and prompt the display device to display the one or both of i) the modified first user input and ii) the modified first result in the workspace document; generate a second API call that includes the one or both of i) the modified first user input and ii) the modified first result, the second API call configured to prompt the AI computer processing system to process the one or both of i) the modified first user input and ii) the modified first result according to the AI algorithm; prompt the network interface to send the second API call to the AI computer processing system; receive a second result from the AI computer processing system, the second result corresponding to a processing of the one or both of i) the modified first user input and ii) the modified first result by the AI computer processing system according to the AI algorithm, wherein receiving the second result is responsive to the network interface sending the second API call to the AI computer processing system; and in response to receiving the second result, prompt the display device to display the second result in the workspace document.

In yet another embodiment, one or more tangible, non-transitory computer readable media store machine readable instructions that, when executed by one or more processors, cause the one or more processors to: receive a first user input to be processed by the AI computer processing system; in response to receiving the first user input, prompt a display device to display the first user input in the workspace document; generate a first application programming interface (API) call that includes the first user input, the first API call configured to prompt the AI computer processing system to process the first user input according to the AI algorithm; prompt a network interface to send the first API call to the AI computer processing system; receive a first result from the AI computer processing system, the first result corresponding to a processing of the first user input by the AI computer processing system according to the AI algorithm, wherein receiving the first result is responsive to the network interface sending the first API call to the AI computer processing system; in response to receiving the first result, prompt the display device to display the first result in the workspace document while displaying the first user input in the workspace document; after receiving the first result, receive a second user input that corresponds to a modification of at least one of i) the first user input, and ii) the first result; in response to receiving the second user input: modify in the workspace document the one or both of i) the first user input and ii) the first result according to the second user input to generate one or both of i) a modified first user input and ii) a modified first result, and prompt the display device to display the one or both of i) the modified first user input and ii) the modified first result in the workspace document; generate a second API call that includes the one or both of i) the modified first user input and ii) the modified first result, the second API call configured to prompt the AI computer processing system to process the one or both of i) the modified first user input and ii) the modified first result according to the AI algorithm; prompt the network interface to send the second API call to the AI computer processing system; receive a second result from the AI computer processing system, the second result corresponding to a processing of the one or both of i) the modified first user input and ii) the modified first result by the AI computer processing system according to the AI algorithm, wherein receiving the second result is responsive to the network interface sending the second API call to the AI computer processing system; and in response to receiving the second result, prompt the display device to display the second result in the workspace document.

DETAILED DESCRIPTION

In various embodiments described herein, a user interface (e.g., a notebook interface) is provided for interacting with an artificial intelligence (AI) processing system. A notebook interface is a computer-executed software program that prompts a display device to display a document (e.g., that corresponds to an electronic file) and provides mechanisms that permit a user to edit contents of the document, such as adding information to the document, modifying information already in the document, rearranging information already in the document, etc. In some embodiments, the notebook interface provides a scrolling mechanism to permit a user to control which portion of the document is displayed on the display device at a given time.

In embodiments described below, the notebook interface allows a user to enter into the document user input and to submit the user input to the AI processing system. The notebook interface receives results generated by the AI processing system (e.g., responsive to the user input), stores the results in the document, and prompts the display device to display the results within the document. Thus, the notebook interface records an interaction and/or a processing history with the AI processing system, stores the interaction/processing history in an electronic file corresponding to the document, and prompts the display device to display the interaction/processing history. Additionally, the notebook interface allows the user to edit the interaction/processing history and submit the edited interaction/processing history to the AI processing system to prompt the AI processing system to generate additional results. The user input received and stored in the document by the notebook interface includes one or more of text, numerical data, mathematical formulae, computer software code, images, etc., according to various embodiments.

Figure 1A:
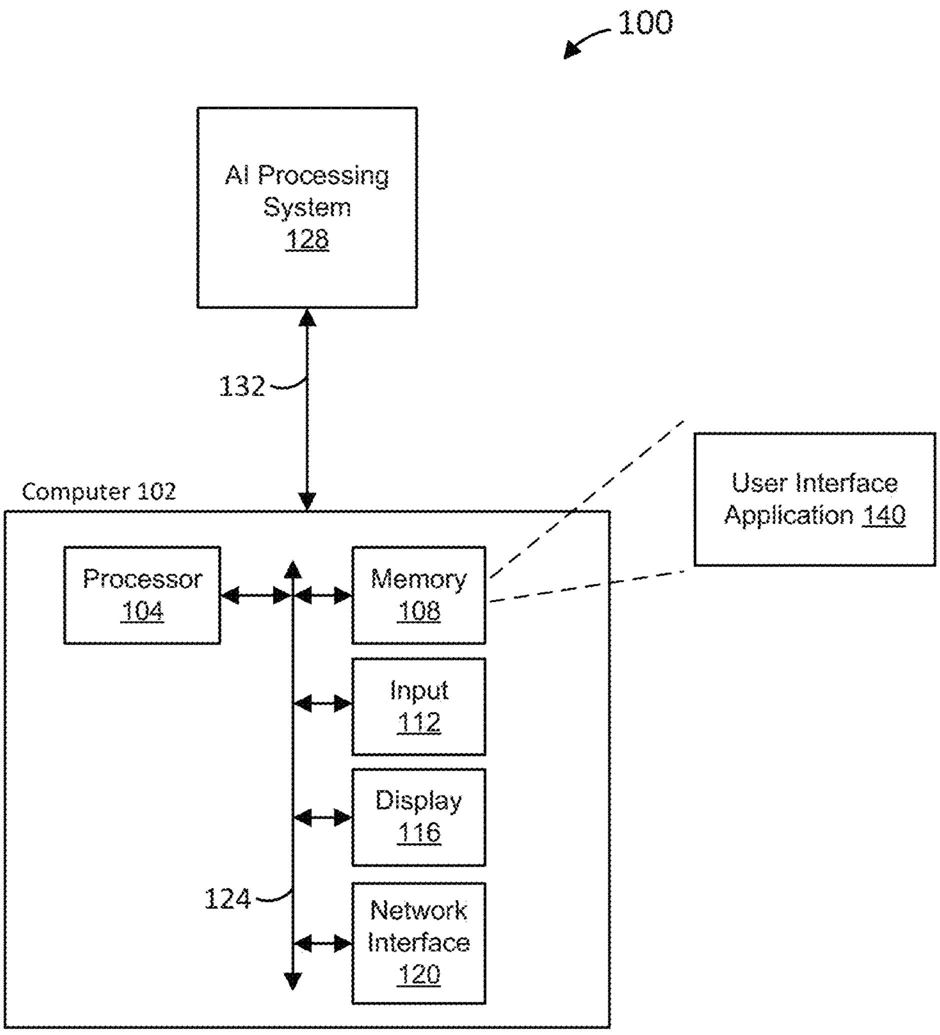
FIGS. 1A-D are simplified diagrams of example systems for interacting with an artificial intelligence (AI) processing system, according to various embodiments.

FIG. 1A is a diagram of an example system 100 for interacting with an AI processing system, according to an embodiment. The system 100 provides a user interface (e.g., a notebook interface) that allows a user to enter user input into a document; submit the user input to the AI processing system; and display results generated by the AI processing system within the document.

The system 100 includes a computer 102 having one or more processors 104 and one or more memory devices 108. The computer 102 also includes, or is coupled to, one or more input devices 112. Additionally, the computer 102 includes, or is coupled to, one or more display devices 116. In some embodiments, the computer 102 includes one or more network interface devices 120. The one or more processors 104, the one or more memory devices 108 (sometime referred to herein as "the memory device 108" for brevity), the one or more input devices 112 (sometime referred to herein as "the input device 112" for brevity), the one or more display devices 116 (sometime referred to herein as "the display device 116" for brevity), the one or more network interface devices 120 (sometime referred to herein as "the network interface device 120" for brevity), etc., may be communicatively coupled via one or more busses 124 (sometime referred to herein as "the bus 124" for brevity). In other embodiments, the computer 102 may have other suitable structures and/or components, and/or may omit some of the components illustrated in FIG. 1.

The one or more processors 104 (sometime referred to herein as "the processor 104" for brevity) may comprise one or more a general purpose processor (e.g., a central processing unit (CPU)), one or more special purpose processors (e.g., a co-processor, a graphics processor, etc.). At least one of the one or more processors 104 executes machine readable instructions stored in the one or more memory devices 108. The one or more memory devices 108 (sometime referred to herein as "the memory 108" for brevity) include one or more of random access memory (RAM), read only memory (ROM), a solid state memory, a magnetic disk drive, an optical disk drive, etc.

The one more input devices 112 include one or more suitable input devices such as a keyboard, a keypad, a mouse, a trackball, one or more buttons, a touch screen that overlays a display device, a microphone, etc. The one or more network interface devices 120 comprise one or more suitable network interface devices (NICs) such as a wired network NIC, a wireless network NIC, etc.

The computer 102 is communicatively coupled to an AI processing system 128 via a communication link 132. The AI processing system 128 may comprise a larger number of interconnected processors (not shown; e.g., graphics processing units (GPUs) or other suitable processors) that are configured to implement an AI processing algorithm, in some embodiments. The AI processing system 128 is configured to implement one or more suitable AI algorithms, AI models, etc., such as an AI chat bot, a Large Language Model (LLM) prompt/response system, a neural network system, an AI image generating system, an AI image processing system, an AI-based computation and information processing system, etc. The AI processing system 128 includes or is coupled to one or more network interface devices (not shown; e.g., one or more suitable NICs) configured to communicate with the computer 102 via the communication link 132.

The communication link 132 comprises a suitable communication link, such as an electrical link, an optical link, a satellite link, a wireless link (e.g., a microwave link, an infrared link, etc.) etc. The network interface device 120 of the computer 102 and the network interface device of (or coupled to) the AI processing system 128 are configured to communicate via the communication link 132. In some embodiments, the communication link 132 comprises a plurality of individual communication links, for example, in parallel, in series (e.g., the system 100 includes one or more repeater devices (not shown) between individual communication links communicatively coupled in series.

In some embodiments, the memory 108 may store a user interface application 140 such as described herein, where the user interface application 140 is configured to provide mechanisms to allow a user (e.g., a person) to interact with the AI processing system 128 via the communication link 132, as is discussed in more detail below. For example, the user interface application 140 implements a notebook interface that allows a user to enter user input into a document; submit the user input to the AI processing system (e.g., via the communication link 132); and display results generated by the AI processing system within the document, according to some embodiments.

In various embodiments, the computer 102 comprises a desktop computer, a workstation, a laptop computer, a tablet computer, a smart phone, a personal digital assistant, a gaming system, a server, etc. In embodiments in which other computers (not shown) similar to the computer 102 are included, the other computers may be of various types.

Figure 1B:
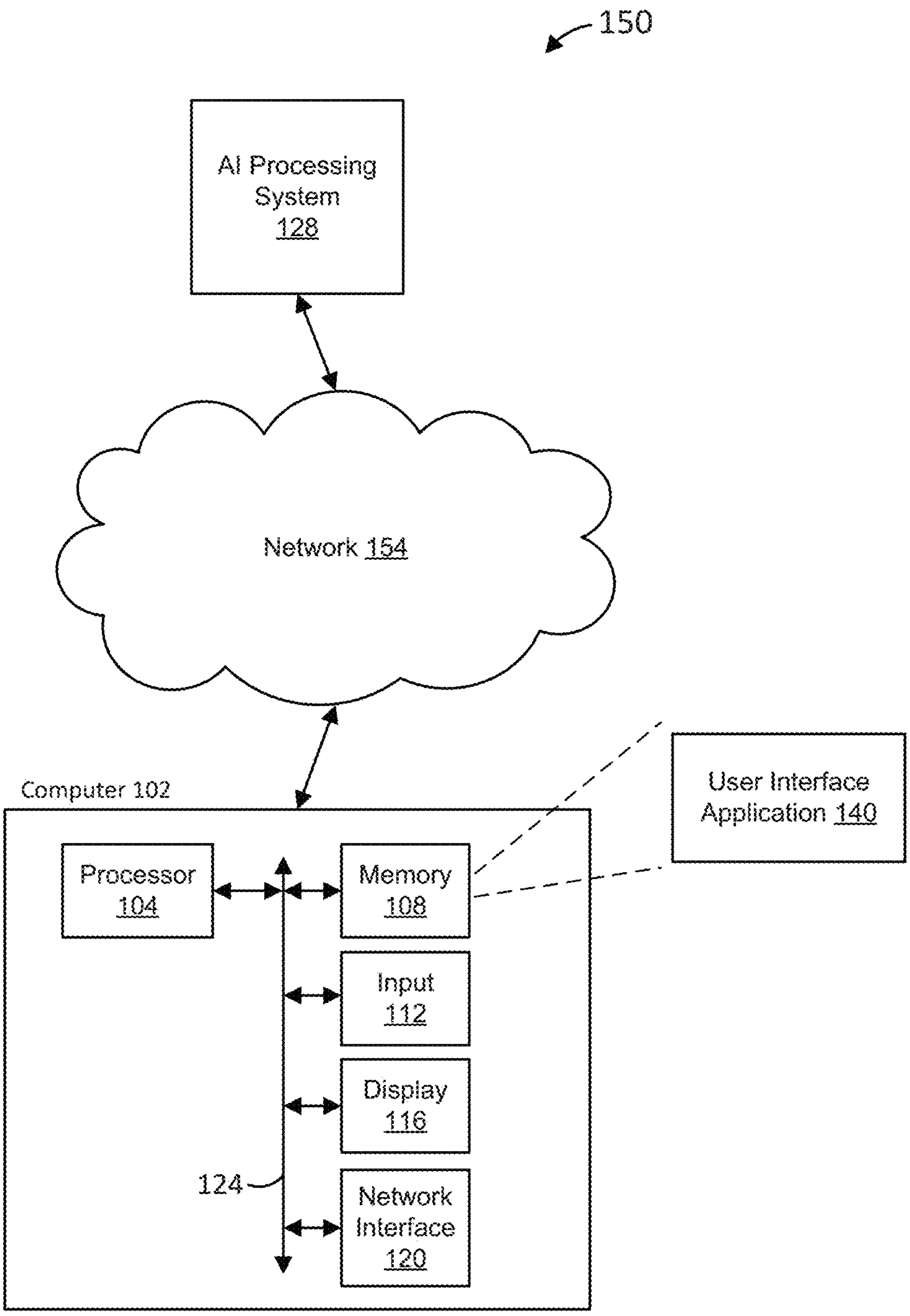

FIG. 1B is a diagram of another example system 150 for interacting with an AI processing system, according to another embodiment. The system 150 is similar to the system 100 of FIG. 1A, and like-numbered elements are not discussed again in detail for brevity.

In the example system 150, the computer 102 is communicatively coupled to the AI processing system 128 via a communication network 154. The communication network 154 may comprise one or more suitable communication networks, such as one or more of a local area network (LAN), a wireless local area network (WLAN), a wide area network (WAN), a metropolitan area network (MAN), a mobile communications network, an intranet, an extranet, the Internet, etc.

The user interface application 140 provides mechanisms that allow a user to interact with the AI processing system 128 via the communication network 154.

Figure 1C:
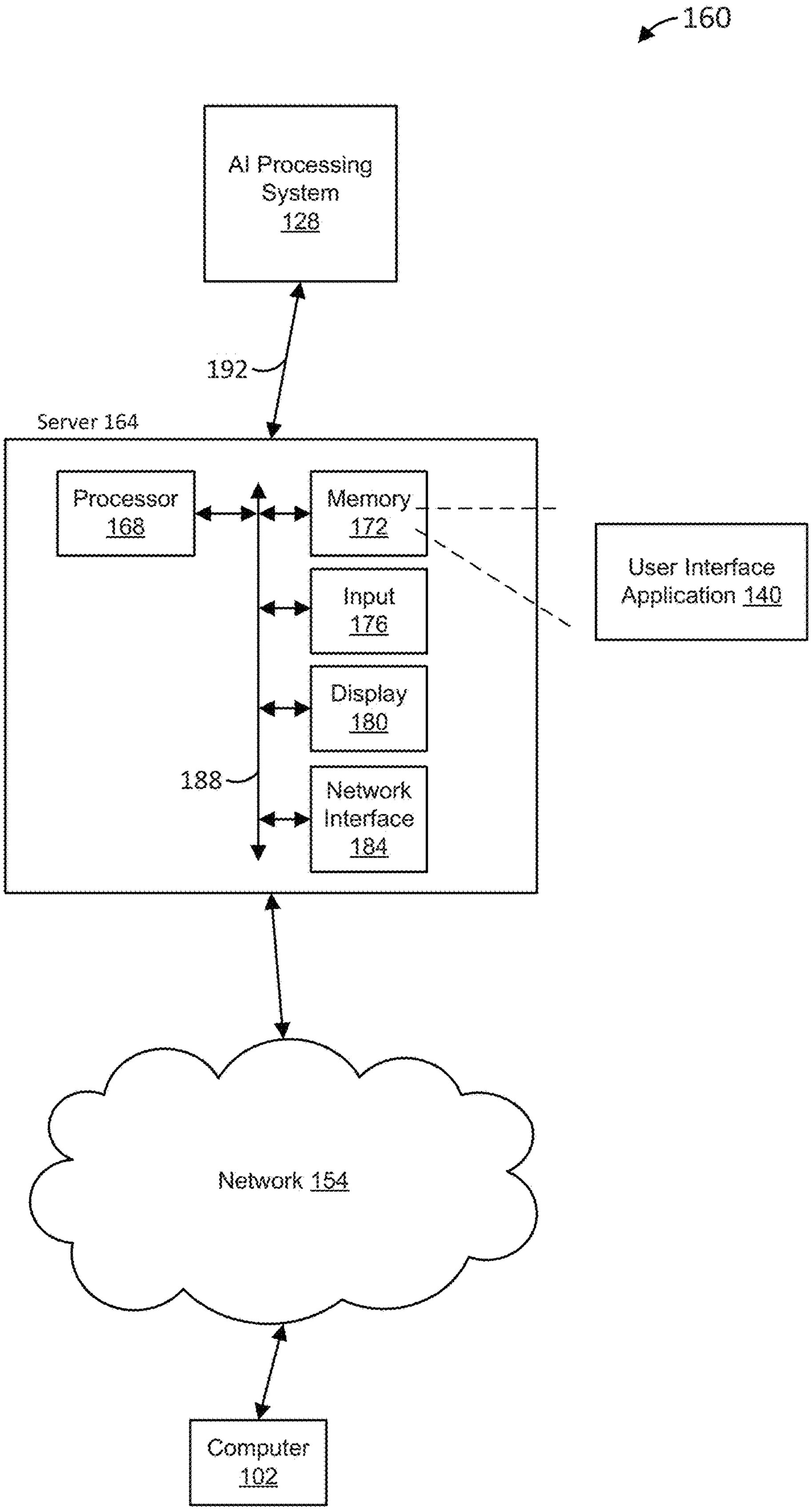

FIG. 1C is a diagram of another example system 160 for interacting with an AI processing system, according to another embodiment. The system 160 is similar to the system 100 of FIG. 1A and the system 150 of FIG. 1B, and like-numbered elements are not discussed again in detail for brevity.

The system 160 includes one or more servers such as a server 164. The server 164 includes one or more processors 168 and one or more memory devices 172. The server 164 also may include, or be coupled to, one or more input devices 176. The server 164 also may include, or be coupled to, one or more display devices 180. The server 152 further includes one or more network interface devices 184.

The one or more processors 168, the one or more memory devices 172, the one or more input devices 176 (sometime referred to herein as "the input device 176" for brevity), the one or more display devices 180 (sometime referred to herein as "the display device 180" for brevity), one or more network interface devices 184 (sometime referred to herein as "the network interface device 184" for brevity), etc., may be communicatively coupled via one or more busses 188 (sometime referred to herein as "the bus 188" for brevity). In other embodiments, the server 152 may have other suitable structures and/or include other suitable components and/or omit one or more of the components illustrated in FIG. 1C.

The one or more processors 168 (sometime referred to herein as "the processor 168" for brevity) may comprise one or more general purpose processors (e.g., a central processing unit), one or more special purpose processors (e.g., a co-processor, a graphics processor, etc.). At least one of the one or more processors 168 executes machine readable instructions stored in the one or more memory devices 172. The one or more memory devices 172 (sometime referred to herein as "the memory 172" for brevity) include one or more of RAM, ROM, a solid state memory, a magnetic disk drive, an optical disk drive, etc.

The one or more network interface devices 170 comprise one or more suitable NICs such as a wired network NIC, a wireless network NIC, etc. The server 164 is communicatively coupled to the computer 102 via the communication network 154. The server 164 is communicatively coupled to the AI processing system 128 via a communication link 192. The communication link 192 is the same as or similar to the communication link 132 of FIG. 1A. The network interface device 184 of the server 164 and the network interface device of (or coupled to) the AI processing system 128 are configured to communicate via the communication link 192.

In some embodiments, the memory 172 of the server 164 may store the user interface application 140. The processor 168 of the server 164 executes the user interface application 140, and the processor 104 of the computer 102 executes a front end application that interfaces with the user interface application 140 via the communication network 154. The user interface application 140 is configured to interface with the front end application via the communication network 154 to implement the notebook interface that allows a user to enter user input into a document; submit the user input to the AI processing system 128 (e.g., via the communication link 192); and display results generated by the AI processing system within the document, according to some embodiments.

In some embodiments, the front end application may be a thin client such as a browser application or another suitable application.

In some embodiments, the user interface application 140 is implemented as a kernel running on the server 164 and a front end running on the computer 102.

Figure 1D:
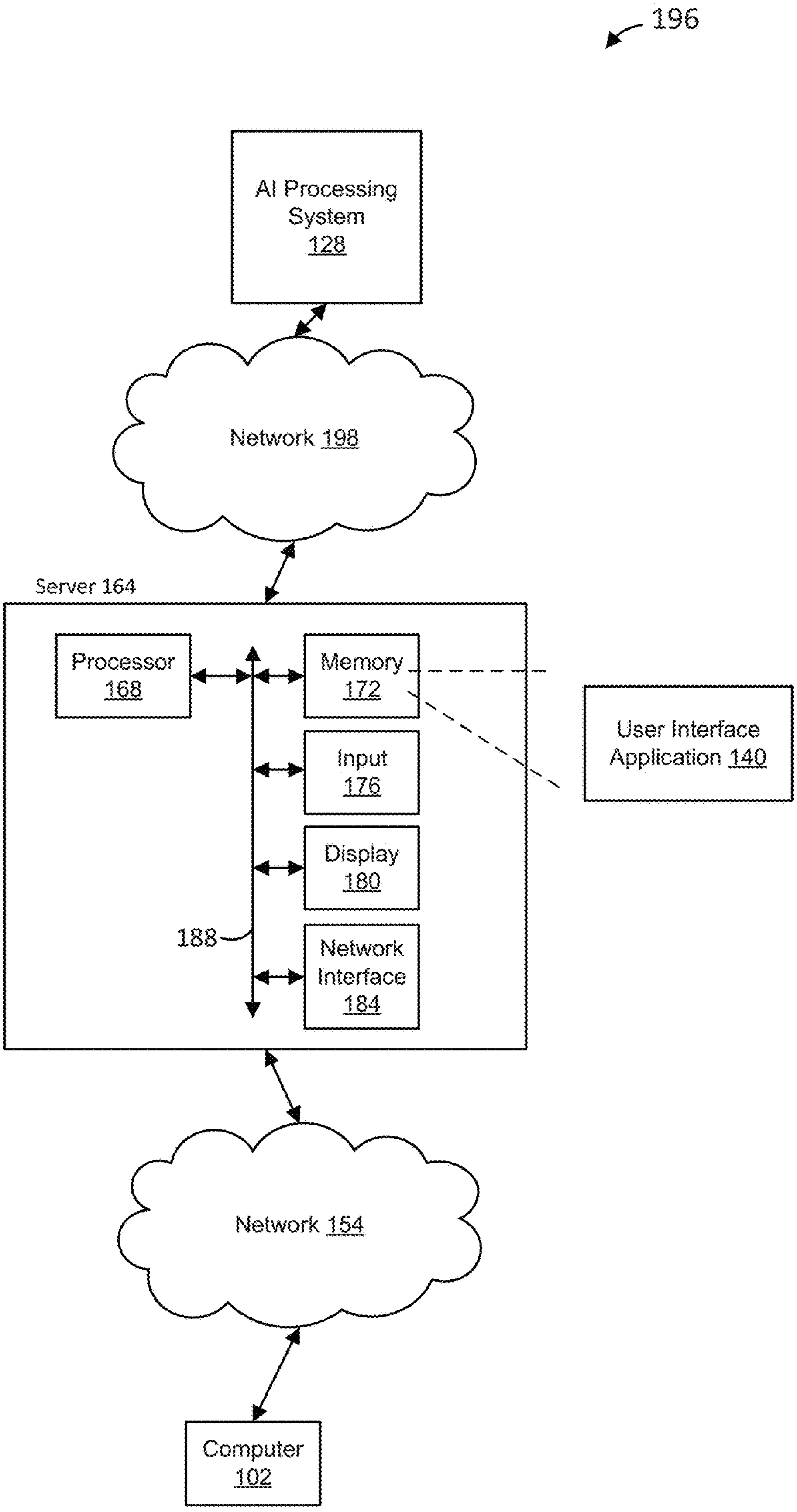

FIG. 1D is a diagram of another example system 196 for interacting with an AI processing system, according to another embodiment. The system 196 is similar to the system 160 of FIG. 1C, and like-numbered elements are not discussed again in detail for brevity.

In the example system 196, the server 164 is communicatively coupled to the AI processing system 128 via a communication network 198. The communication network 198 may comprise one or more suitable communication networks, such as one or more of a LAN, a WLAN, a WAN, a MAN, a mobile communications network, an intranet, an extranet, the Internet, etc. In some embodiments, the communication network 198 and the communication network 154 are a same communication network. In other embodiments, the communication network 198 and the communication network 154 are different communication networks.

Figure 2:
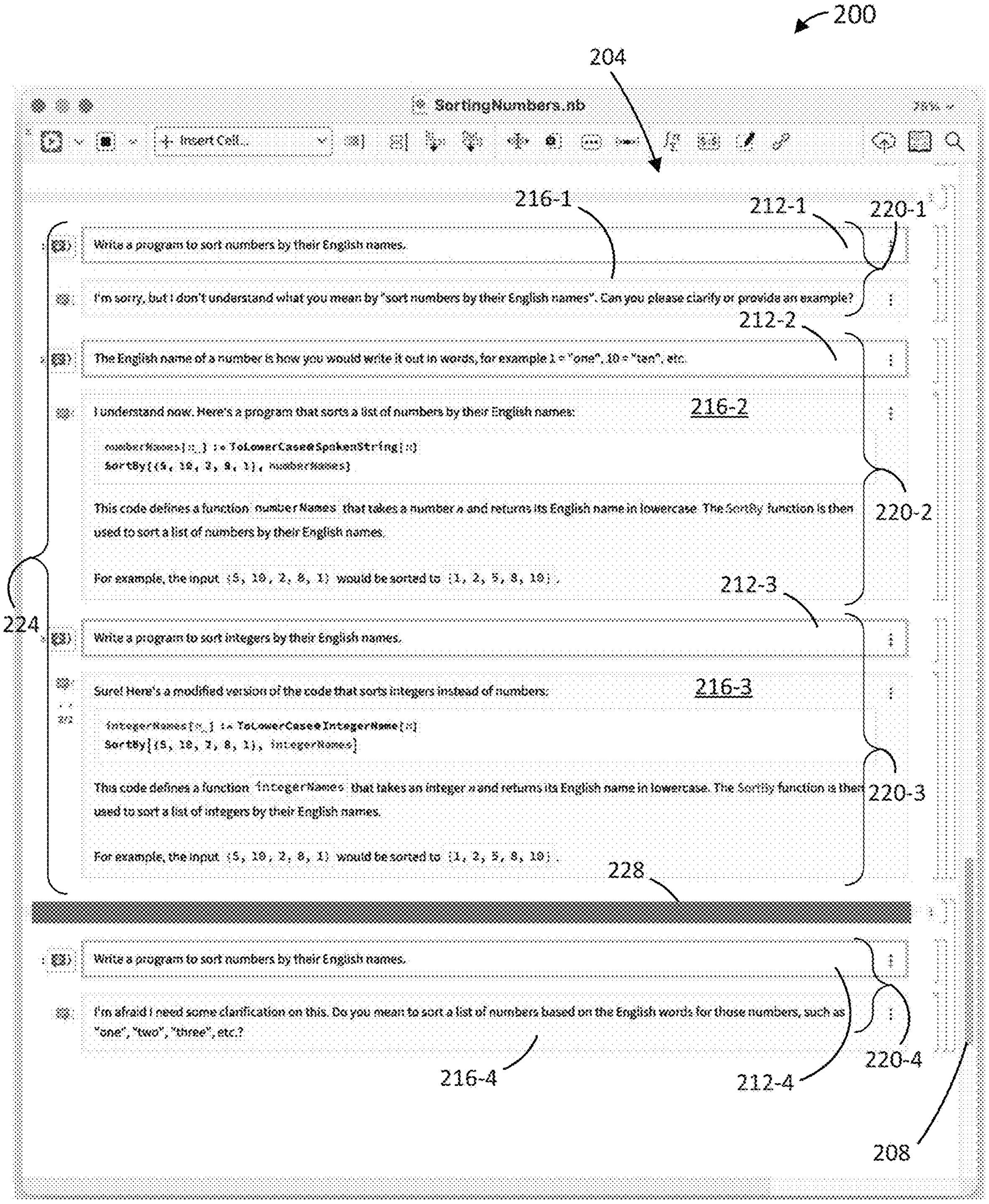
FIG. 2 is a diagram illustrating an example display generated by a user interface application of FIGS. 1-D, the display including a document for interacting with the AI processing system, according to an embodiment.

FIG. 2 is a diagram illustrating an example display 200 generated by the user interface application 140, according to an embodiment. The display 200 includes a document (e.g., a notebook) 204. The document 204 is sometimes referred to herein as a "workspace document" or a "notebook." The user interface 140 allows a user to enter user input into the document 204. In connection with receiving results from the AI processing system 128, the user interface 140 displays the results within the document 204. The document 204 illustrates interactions, a processing history, etc., between a user and the AI processing system 128. As will be described in more detail below, the user interface 140 allows a user to edit content in the document 204, rearrange the content etc.

The user interface application 140 provides a scrolling mechanism 208 to permit a user to control which portion of the document 204 is displayed on the display device at a given time. Additionally, the user interface application 140 generates the document 204 to includes cells 212, 216, which correspond to zones within the document 204. In some embodiments, the cells 212, 216 are displayed in a visually distinguishable manner to allow a user to visually differentiate cells 212, 216 that include different types of data (e.g., user input, result, commentary, section heading, title, etc.). In some embodiments, the cells 212, 216 are visually marked to indicate a type of data included within the cell 212, 216 (e.g., user input, result, commentary, section heading, title, etc.).

In the example of FIG. 2, the document 204 includes input cells 212 and output cells 216. The user interface application 140 permits a user to input user input information in the input cells 212 using input devices such as a keyboard, a mouse, a touchpad, a touchscreen, a microphone, etc.

In an illustrative interaction, a user types text or computer code (or "copy and pastes" the text or computer code) into an input cell 212, and then prompts the user interface application 140 (e.g., by pressing "Enter" on a keyboard or taking some other suitable action) to send the contents of the input cell 212 to the AI processing system 128. For example, the user interface application 140 generates an application programming interface (API) call that includes the contents of the input cell 212 and sends the API call to the AI processing system 128, e.g., via a communication link, a communication network, etc.

In response to the API call, the AI processing system 128 processes the contents of the input cell 212 to generate an output (sometimes referred to herein as a "result"), and sends the result back to the user interface application 140 in an API response via the communication link, the communication network, etc. In response to receiving the API response, the user interface application 140 displays the result in one or more output cells 216. In an embodiment in which the cells 212, 216 arranged vertically on a display, the one or more output cells 216 are placed below the input cell 212 corresponding to the API call, pushing any existing content (if any) below the input cell 212 farther down in the document 204.

In another illustrative interaction, a user edits an existing input cell 212 and then prompts the user interface application 140 (e.g., by pressing "Enter" on a keyboard or taking some other suitable action) to send the revised contents of the input cell 212 to the AI processing system 128. For example, the user interface application 140 generates an API call that includes the revised contents of the input cell 212 and sends the API call to the AI processing system 128, e.g., via the communication link, the communication network, etc.

In response to the API call, the AI processing system 128 processes the contents of the input cell 212 to generate a new result, and sends the new result back to the user interface application 140 in an API response via the communication link, the communication network, etc. In response to receiving the API response, the user interface application 140 deletes the previous one or more output cells 216 from the document 204 and displays the result in one or more new output cells 216.

In another embodiment in which a user edits an existing input cell 212 that is part of an interaction that includes one or more subsequent input cells 212 that were previously evaluated by the AI processing system 128, the user prompts the user interface application 140 to send the revised contents of the input cell 212 and other information from the interaction to the AI processing system 128. For example, the user interface application 140 generates an API call that includes the revised contents of the input cell 212 and the other information from the interaction, and sends the API call to the AI processing system 128. In an embodiment, the other information from the interaction includes contents of the one or more subsequent input cells 212 that were previously evaluated by the AI processing system 128. In another embodiment, the other information from the interaction additionally or alternatively includes contents of one or more output cells 216 that were generated by the AI processing system 128 using the contents of one or more subsequent input cells 212.

In another embodiment in which a user edits an existing input cell 212 that is part of an interaction that includes one or more subsequent input cells 212 that were previously evaluated by the AI processing system 128, the user prompts the user interface application 140 to send the revised contents of the input cell 212, and comments of the one or more subsequent input cells 212 to the AI processing system 128 in an sequential manner that mimics the previous interaction with the AI processing system 128. For example, the user interface application 140 generates a first API call that includes the revised contents of a first input cell 212, and sends the first API call to the AI processing system 128. Additionally, the user interface application 140 generates a second API call that includes contents of a subsequent second input cell 212, and sends the second API call to the AI processing system 128 after sending the first API call, and so on.

Input cells 212 and output cells 216 may optionally be grouped into higher level zones 220 (sometimes referred to herein as "cell groups") within the document, in some embodiments. Cell groups 220 optionally may themselves be grouped into other cell groups 224, in some embodiments.

As will be described further below, the user interface application 140 permits other cells to be added between input cells 212 and output cells 216, and/or between cell groups 220, such as cells containing information (e.g., text, commentary, section headings, titles, images, inactive machine-readable computer code (e.g., software), etc.) that is not to be provided as input to the AI processing system 128, in some embodiments.

In an embodiment, the user interface application 140 permits a user to divide the document 204 into two or more sections, where information in one section of the document 204 does not affect one or more other sections in the document 204, and vice versa. For example, an interaction with the AI processing system 128 in one section does not affect an interaction with the AI processing system 128 in another section, and vice versa. In some embodiments, the user interface application 140 permits the user to configure a first section of the document 204 to interact with a first AI processing system and configure a second section of the document 204 to interact with a second AI processing system different than the first AI processing system. In some embodiments, the user interface application 140 permits the user to configure a first section of the document 204 to interact with a first AI algorithm (or AI model) implemented by the AI processing system 128 and configure a second section of the document 204 to interact with a second AI algorithm (or AI model) implemented by the AI processing system 128, where the first AI algorithm is different than the second AI algorithm. In some embodiments, the user interface application 140 permits the user to configure a first section of the document 204 to interact with the AI processing system 128 as configured according to a first set of operational parameters and configure a second section of the document 204 to interact with the AI processing system 128 as configured according to a second set of operational parameters, where the first set of operational parameters is different than the second set of operational parameters.

In FIG. 2, the document 204 includes a visual symbol 228 that indicates a divider between sections of the document 204, where content above the symbol 228 in FIG. 2 corresponds to a first section of the document 204 and content below the symbol 228 in FIG. 2 corresponds to a first section of the document 204. The user interface application 140 includes one or mechanisms that allows the user to place one or more dividers such as the divider 228 in the document 204 at a location(s) chosen by the user. The user interface application 140 interacts with the AI processing system 128 regarding contents of the input cell 212-4 in a manner such that the AI processing system 128 does not consider information from any interactions above the divider 228. Similarly, the user interface application 140 interacts with the AI processing system 128 regarding contents of any of the input cells 212-1 to 212-3 in a manner such that the AI processing system 128 does not consider information from any interactions below the divider 228. Thus, respective interactions with the AI processing system 128 in the different sections of the document 204 may be considered to be independent "conversations" with the AI processing system 128 that are independent, in some embodiments.

In the example of FIG. 2, the user has input into the input cell 212-1 first information (a first "user input") and prompted the user interface application 140 to submit the first user input to the AI processing system 128. In response, the user interface application 140 generates a first API call that includes the first user input, and sends the first API call to the user interface application 140. The AI processing system 128 processes the first user input, generates a first output (a first "result"), and sends the first result to a computer implementing the user interface application 140 in a first API response. In response to the first API response, the user interface application 140 displays the first result in the output cell 216-1.

Additionally, the user has input into the input cell 212-2 second information (a second "user input") and prompted the user interface application 140 to submit the second user input to the AI processing system 128. In response, the user interface application 140 generates a second API call that includes the second user input, and sends the second API call to the user interface application 140. The AI processing system 128 processes the second user input, generates a second output (a second "result"), and sends the second result to the computer implementing the user interface application 140 in a second API response. The AI processing system 128 is aware of the context of the second user input, i.e., the AI processing system 128 is aware of the first user input and the first result, and thus generates the second result further based on the first user input and the first result. In response to the second API response, the user interface application 140 displays the second result in the output cell 216-2.

Additionally, the user has input into the input cell 212-3 third information (a third "user input") and prompted the user interface application 140 to submit the third user input to the AI processing system 128. In response, the user interface application 140 generates a third API call that includes the third user input, and sends the third API call to the user interface application 140. The AI processing system 128 processes the third user input, generates a third output (a third "result"), and sends the third result to the computer implementing the user interface application 140 in a third API response. The AI processing system 128 is aware of the context of the third user input, i.e., the AI processing system 128 is aware of the first user input, the first result, the second user input, and the second result, and thus generates the third result further based on the first result, the second user input, and the second result. In response to the third API response, the user interface application 140 displays the third result in the output cell 216-3.

On another side of the divider 228, the user has input into the input cell 212-4 fourth information (a fourth "user input") and prompted the user interface application 140 to submit the fourth user input to the AI processing system 128. In response, the user interface application 140 generates a fourth API call that includes the fourth user input, and sends the fourth API call to the user interface application 140 in a manner such that the AI processing system 128 does not consider information from any interactions above the divider 228. The AI processing system 128 processes the fourth user input, generates a fourth output (a fourth "result"), and sends the fourth result to the computer implementing the user interface application 140 in a fourth API response. The AI processing system 128 does not consider any information above the divider 228 when processing the fourth user input, and thus generates the fourth result independent of any information above the divider 228, according to an embodiment. In response to the fourth API response, the user interface application 140 displays the fourth result in the output cell 216-4.

In some embodiments, the user interface application 140 provides user interface mechanisms for one or more of i) selecting AI algorithms/models to be used in connection with the document 204 or sections within the document 204; ii) configuring operation of the AI processing system 128 in connection with the document 204 or sections within the document 204; iii) configuring the user interface application 140 in connection with one or more of: the document 204, sections within the document 204, interaction with the AI processing system 128, etc. In various embodiments, the user interface mechanisms include one or more of: i) graphical user interface mechanisms such as one or more of: menus, buttons, check boxes, etc.; ii) commands (e.g., that include predetermined keywords that the user interface application 140 is configured to recognize) that can be entered into the document 204; iii) voice commands (e.g., that include predetermined keywords such as described above); etc.

Figure 3:
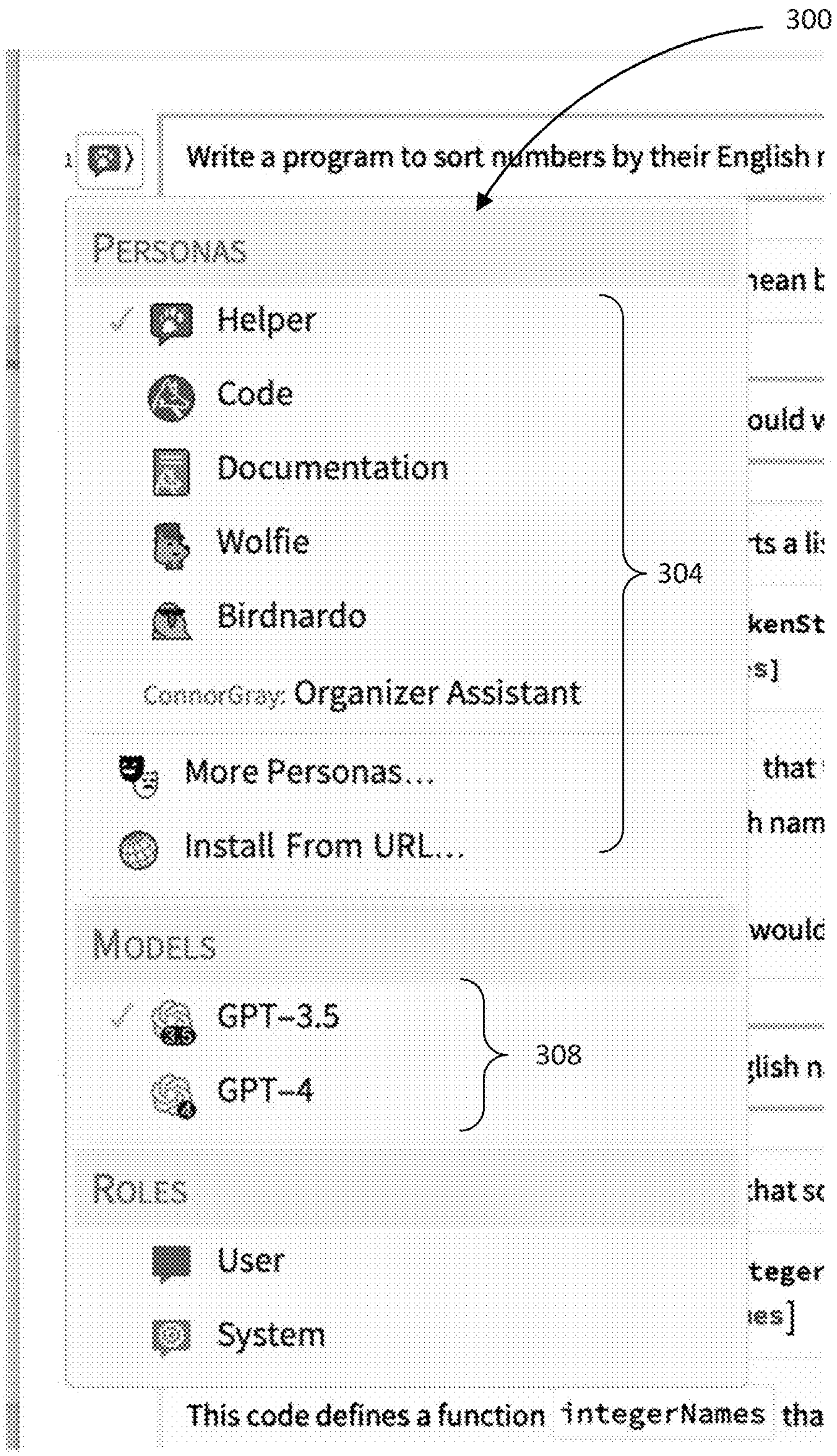
FIG. 3 is a diagram illustrating an example menu that the user interface application of FIGS. 1A-D provides for selecting AI algorithms/models and/or configuring operation of the AI processing system in connection with a document or sections within the document, according to an embodiment.

FIG. 3 is a diagram illustrating an example menu 300 that the user interface application 140 provides for selecting AI algorithms/models and/or configuring operation of the AI processing system 128 in connection with the document 204 or sections within the document 204, according to an embodiment. In other embodiments, the user interface application 140 additionally or alternatively provides another suitable menu and/or other suitable user interface mechanisms different than the menu 300.

In an embodiment, the menu 300 corresponds to selections for the document 204 as a whole such that selections made apply to all sections in the document 204. In another embodiment, the menu 300 corresponds to selections for a particular section within the document 204 such that selections made do not apply to any other sections in the document, in an embodiment.

The menu 300 includes a first set of elements 304 for selecting a persona to be used by the AI processing system 128 when one or both of i) processing user inputs entered into the document (or a particular section within the document), and ii) generating outputs (results) that are to be included in the document (or the particular section within the document).

In an embodiment, the set of elements 304 includes one or more elements corresponding to predetermined personas. In another embodiment, the set of elements 304 additionally or alternatively includes one or more elements corresponding to characteristics corresponding to personas, such as one or more of: an identity (e.g., a name of the persona, an occupation of the persona, a background of the persona, a role of the personal in a conversational context, etc.), characteristics (e.g., a personality trait, a communication style, beliefs, values, etc.), knowledge/expertise, relevant past experience, etc.

The menu 300 also includes a second set of elements 308 for selecting an AI algorithm and/or model to be used for i) processing user inputs entered into the document (or a particular section within the document), and ii) generating outputs (results) that are to be included in the document (or the particular section within the document).

In other embodiments, the menu 300 omits the second set of elements 308, or omits the first set of elements 304. In other embodiments, the menu 300 omits the second set of elements 308, and the user interface application 140 provides a separate menu includes the second set of elements 308.

Figure 4:
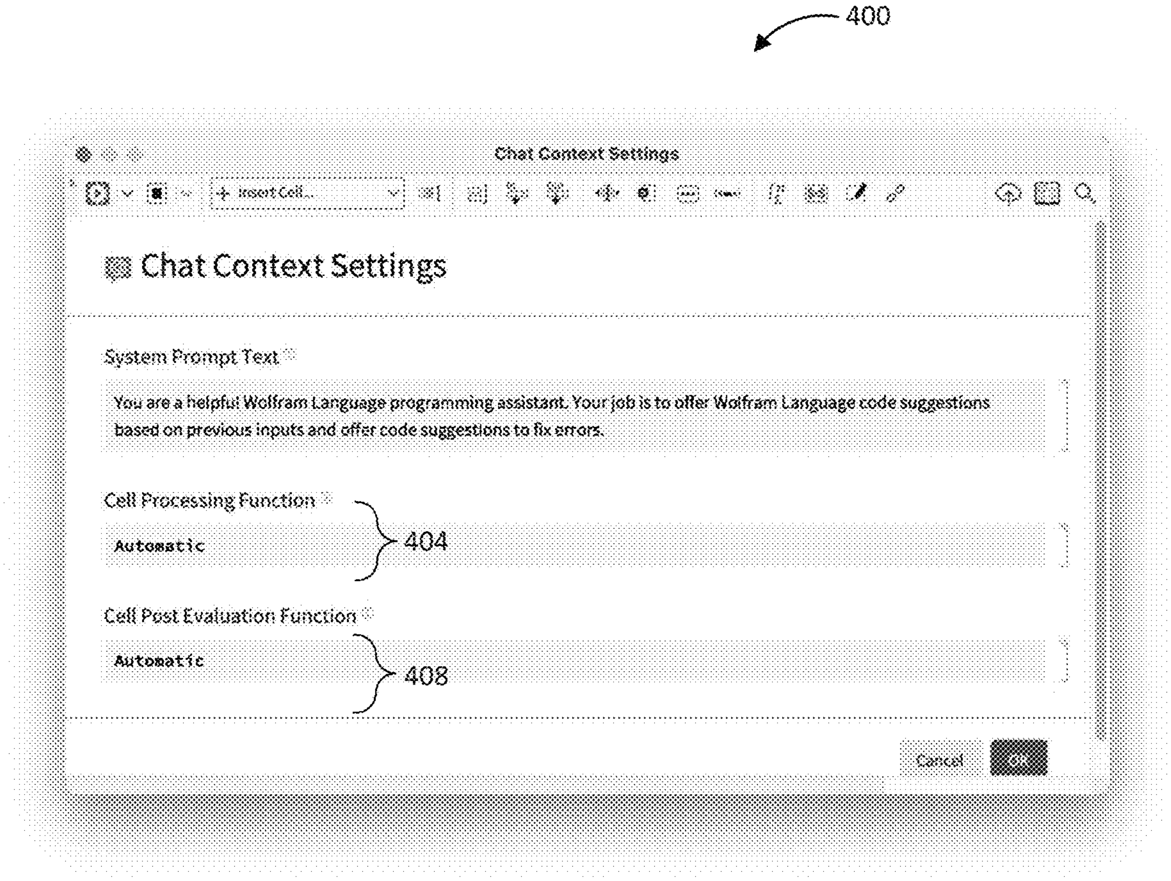
FIG. 4 is a diagram illustrating another example menu that the user interface application of FIGS. 1A-D provides for configuring operation of the user interface application in connection with interactions with the AI processing system 128, according to another embodiment.

FIG. 4 is a diagram illustrating an example menu 400 that the user interface application 140 provides for configuring operation of the user interface application 140 in connection with interactions with the AI processing system 128 regarding the document 204 or sections within the document 204, according to an embodiment. In other embodiments, the user interface application 140 additionally or alternatively provides another suitable menu and/or other suitable user interface mechanisms different than the menu 400.

In an embodiment, the menu 400 corresponds to selections for the document 204 as a whole such that selections made apply to all sections in the document 204. In another embodiment, the menu 400 corresponds to selections for a particular section within the document 204 such that selections made do not apply to any other sections in the document, in an embodiment.

The menu 400 includes a first set of one or more menu elements 404 for selecting one or more first functions to be applied by the user interface application 140 to content of input cells 212 (e.g., user input) prior to sending the user input to the AI processing system 128. For example, a first function may be applied by the user interface application 140 to convert user input in an input cell 212 in a first format to a different second format that is suitable for processing by the AI processing system 128, in an embodiment.

The menu 400 includes a second set of one or more menu elements 404 for selecting one or more second functions to be applied by the user interface application 140 to outputs (results) from the AI processing system 128. For example, a second function may be applied by the user interface application 140 to convert an output received from the AI processing system 128 in a first format to a different second format that is desired by the user, in an embodiment.

In other embodiments, the menu 400 omits the second set of elements 408, or omits the first set of elements 404. In other embodiments, the menu 400 omits the second set of elements 408, and the user interface application 140 provides a separate menu that includes the second set of elements 408.

Figure 5:
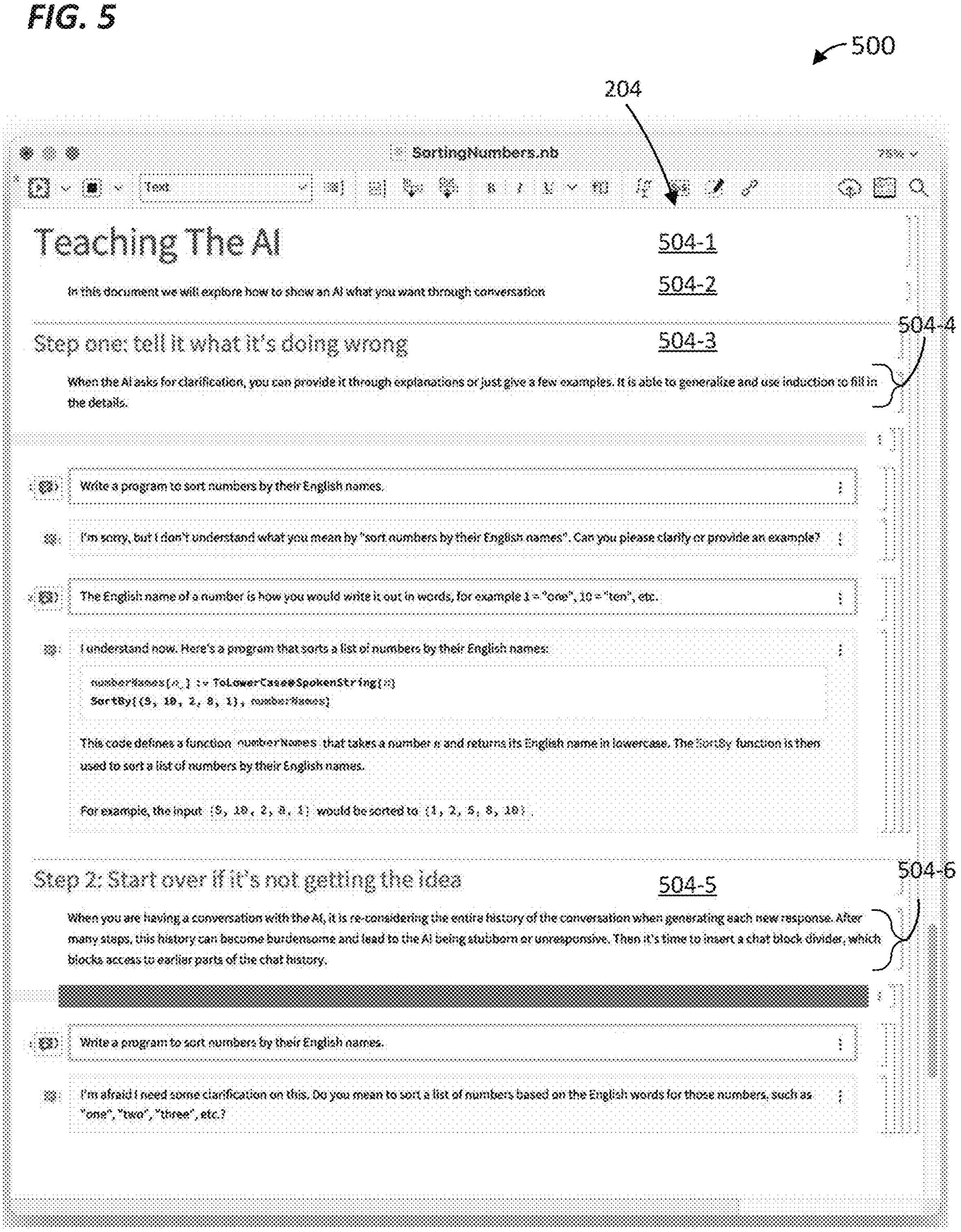
FIG. 5 is a diagram illustrating an example display generated by the user interface application that displays the document of FIG. 2 after modification by a user, according to an embodiment.

FIG. 5 is a diagram illustrating an example display 500 generated by the user interface application 140, according to an embodiment. The display 500 includes the document 204 of FIG. 2, but including other cells 504 that include information such as one or more of text, commentary, section headings, titles, etc., that are not provided to the AI processing system 128 and are not received from the AI processing system 128. The user interface application 140 allows a user to add such cells to the document 204.

The cell 504-1 includes a title of the document 204, i.e., "Teaching The AI". The cell 504-2 includes text. The cell 504-3 includes a section heading. The cell 504-4 includes text. The cell 504-5 includes a section heading. The cell 504-5 includes text.

In other embodiments, the user interface application 140 additionally or alternatively allows a user to add cells that include one or more other suitable types of information that are not to be provided as input to the AI processing system 128 and that are not received from the AI processing system, such as one or more of machine-readable computer code (e.g., software), pictures, graphics, videos, etc.).

Figure 6:
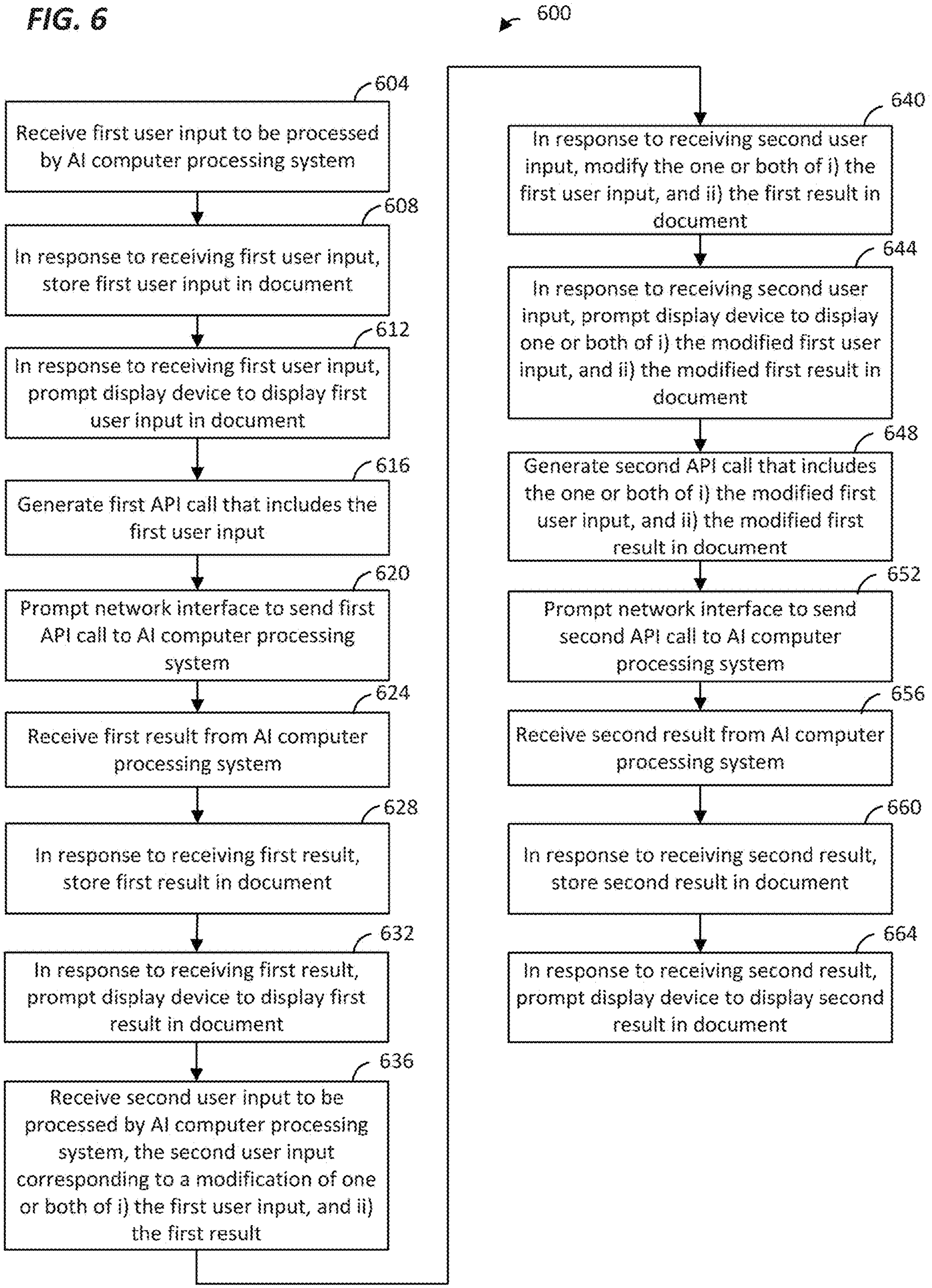
FIG. 6 is a flow diagram of an example method for interacting with an AI computer processing system, according to an embodiment.

FIG. 6 is a flow diagram of an example method 600 for interacting with an AI computer processing system, according to an embodiment. The method 600 may be implemented in one or more of the example systems 100, 150, 160, and 196 of FIGS. 1A-D, in various embodiments, and the method 600 is described with reference to FIGS. 1A-D for explanatory purposes. In other embodiments, however, the method 600 is implemented in another suitable system. In some embodiments, another suitable method different than the method 600 is implemented in one or more of the systems 100, 150, 160, and 196 of FIGS. 1A-D.

The method 600 is also described with reference to FIG. 2 for explanatory purposes. In some embodiments, one or more actions associated with the user interface application described with reference to FIG. 2 are used in conjunction with the method 600. In other embodiments, however, the method 600 is implemented using another suitable workspace document different than the display document 204 and/or the actions associated with the user interface application described with reference to FIG. 2. In some embodiments, the example workspace document 204 is used in connection with another suitable method different than the method 600.

At block 604, one or more computer processors receive (e.g., the processor 104 receives, the processor 168 receives, etc.) a first user input to be processed by the AI computer processing system. In some embodiments, the first user input is input by the user using one or more user input devices (e.g., the input device 112, the input device 176, etc.) that are communicatively coupled to the one or more computer processors.

At block 608, in response to receiving the first user input at block 604, the one or more computer processors store (e.g., the processor 104 stores, the processor 168 stores, etc.) the first user input in a workspace document. For example, the first user input is stored in a file corresponding to the workspace document, where the file is stored in a memory device (e.g., the memory device 108, the memory device 172, etc.) communicatively coupled to the one or more computer processors.

At block 612, in response to receiving the first user input at block 604, the one or more computer processors prompt (e.g., the processor 104 prompts, the processor 168 prompts, etc.) a display device (e.g., the display device 116, the display device 180, etc.) to display the first user input in the workspace document. For example, the one or more computer processors generate a window (e.g., like the example display 200 or another suitable display) that includes the workspace document having the first user input, and prompt the display device to display the window. As another example, the one or more computer processors generate (e.g., the processor 168 generates, etc.) display data (e.g., web page information or other suitable display data) that includes the workspace document having the first user input, and sends the display data to a user computer, which prompts a display device of the user computer to display the display data.

At block 616, the one or more computer processors generate (e.g., the processor 104 generates, the processor 168 generates, etc.) a first API call that includes the first user input. The first API call is configured to prompt the AI computer processing system to process the first user input according to an AI algorithm. In an embodiment, generating the first API call at block 616 is performed in response to receiving the first user input at block 604. In another embodiment, generating the first API call at block 616 is performed additionally or alternatively in response to a user input received by the one or more processors, such as a command, a key press, etc., indicative of a user command to send and/or generate the first API call.

At block 620, the one or more computer processors prompt (e.g., the processor 104 prompts, the processor 168 prompts, etc.) a network interface device (e.g., the network interface device 120, the network interface device 184, etc.) to send the first API call to the AI computer processing system. Prompting the network interface device to send the first API call comprises sending a communication frame having the first API call to the network interface device, in an embodiment.

At block 624, the one or more computer processors receive (e.g., the processor 104 receive, the processor 168 receive, etc.) a first result from the AI computer processing system. The first result corresponds to a processing of the first user input by the AI computer processing system according to the AI algorithm. Receiving the first result at block 624 is responsive to the network interface sending the first API call to the AI computer processing system. For example, the AI processing system generates the first result in response to a processing of the first user input by the AI computer processing system.

The first result is received by the one or more computer processors by way of the network interface device network interface device (e.g., the network interface device 120, the network interface device 184, etc.), in an embodiment. For example, the network interface device receives the first result from the AI computer processing system and sends the first result to the one or more processors, in an embodiment.

At block 628, in response to receiving the first result at block 624, the one or more computer processors store (e.g., the processor 104 stores, the processor 168 stores, etc.) the first result in the workspace document. For example, the first result is stored in a file corresponding to the workspace document, where the file is stored in the memory device (e.g., the memory device 108, the memory device 172, etc.) communicatively coupled to the one or more computer processors. In an embodiment, storing the first result in the workspace document at block 628 comprises storing the first result in the workspace document while the first user input is also stored in the workspace document.

At block 632, in response to receiving the first result at block 624, the one or more computer processors prompt (e.g., the processor 104 prompts, the processor 168 prompts, etc.) the display device (e.g., the display device 116, the display device 180, etc.) to display the first result in the workspace document. For example, the one or more computer processors generate a window (e.g., like the example display 200 or another suitable display) that includes the workspace document having the first result, and prompt the display device to display the window. In an embodiment, displaying the first result in the workspace document at block 632 comprises displaying the first result in the workspace document while the first user input is also displaying in the workspace document.

At block 636, after receiving the first result at block 628, the one or more computer processors receive (e.g., the processor 104 receives, the processor 168 receives, etc.) a second user input to be processed by the AI computer processing system. In some embodiments, the second user input is input by the user using one or more user input devices (e.g., the input device 112, the input device 176, etc.) that are communicatively coupled to the one or more computer processors. In an embodiment, the second user input that corresponds to a modification of one or both of i) the first user input (e.g., stored in the workspace document at block 608), and ii) the first result (e.g., stored in the workspace document at block 628). The modification of the one or both of i) the first user input and ii) the first result comprises one or more of: i) an adding of text without deleting existing text, ii) a replacement of some existing text with new text while leaving other existing text unchanged, iii) a deletion of some existing text while leaving other existing text unchanged, iv) a modification of an image without deleting the image, v) an adding of data without deleting existing data, vi) a replacement of some existing data with new data while leaving other existing data unchanged, vii) a deletion of some existing data while leaving other existing data unchanged, according to various embodiments. In some embodiments, the modification of the one or both of i) the first user input and ii) the first result comprises entirely replacing one or both of i) the first user input and ii) the first result with new user input. Modifying text such as described above includes one or more of modifying natural language text, modifying text corresponding to a software programming language, etc., according to various embodiments.

At block 640, in response to receiving the second user input at block 636, the one or more processors modify (e.g., the processor 104 modifies, the processor 168 modifies, etc.) the one or both of i) the first user input and ii) the first result in the workspace document according to the second user input to generate one or both of i) a modified first user input and ii) a modified first result, which is stored in the workspace document. For example, the one or both of i) the modified first user input and ii) the modified first result are stored in the file corresponding to the workspace document, where the file is stored in the memory device (e.g., the memory device 108, the memory device 172, etc.) communicatively coupled to the one or more computer processors.

At block 644, in response to receiving the second result at block 636, the one or more computer processors prompt (e.g., the processor 104 prompts, the processor 168 prompts, etc.) the display device (e.g., the display device 116, the display device 180, etc.) to display the one or both of i) the modified first user input and ii) the modified first result in the workspace document. For example, the one or more computer processors generate a window (e.g., like the example display 200 or another suitable display) that includes the workspace document having the one or both of i) the modified first user input and ii) the modified first result, and prompt the display device to display the window.

generating, at the one or more computer processors, a second API call that includes the modified first user input, the second API call configured to prompt the AI computer processing system to process the modified first user input according to the AI algorithm;

At block 648, the one or more computer processors generate (e.g., the processor 104 generates, the processor 168 generates, etc.) a second API call that includes the one or both of i) the modified first user input and ii) the modified first result. The second API call is configured to prompt the AI computer processing system to process the one or both of i) the modified first user input and ii) the modified first result according to an AI algorithm. In an embodiment, generating the second API call at block 648 is performed in response to receiving the second user input at block 636. In another embodiment, generating the second API call at block 648 is performed additionally or alternatively in response to a user input received by the one or more processors, such as a command, a key press, etc., indicative of a user command to generate and/or send the second API call.

At block 652, the one or more computer processors prompt (e.g., the processor 104 prompts, the processor 168 prompts, etc.) the network interface device (e.g., the network interface device 120, the network interface device 184, etc.) to send the second API call to the AI computer processing system. Prompting the network interface device to send the second API call comprises sending a communication frame having the second API call to the network interface device, in an embodiment.

At block 656, the one or more computer processors receive (e.g., the processor 104 receive, the processor 168 receive, etc.) a second result from the AI computer processing system. The second result corresponds to a processing of the one or both of i) the modified first user input and ii) the modified first result by the AI computer processing system according to the AI algorithm. Receiving the second result at block 656 is responsive to the network interface sending the second API call to the AI computer processing system. For example, the AI processing system generates the second result in response to a processing of the one or both of i) the modified first user input and ii) the modified first result by the AI computer processing system.

The second result is received by the one or more computer processors by way of the network interface device network interface device (e.g., the network interface device 120, the network interface device 184, etc.), in an embodiment. For example, the network interface device receives the second result from the AI computer processing system and sends the second result to the one or more processors, in an embodiment.

At block 660, in response to receiving the second result at block 656, the one or more computer processors store (e.g., the processor 104 stores, the processor 168 stores, etc.) the second result in the workspace document. For example, the second result is stored in the file corresponding to the workspace document, where the file is stored in the memory device (e.g., the memory device 108, the memory device 172, etc.) communicatively coupled to the one or more computer processors. In an embodiment in which the second result is generated based on a modified first user input, storing the second result in the workspace document at block 660 comprises storing the second result in the workspace document while the modified first user input is also stored in the workspace document.

At block 664, in response to receiving the second result at block 656, the one or more computer processors prompt (e.g., the processor 104 prompts, the processor 168 prompts, etc.) the display device (e.g., the display device 116, the display device 180, etc.) to display the second result in the workspace document. For example, the one or more computer processors generate a window (e.g., like the example display 200 or another suitable display) that includes the workspace document having the second result, and prompt the display device to display the window. In an embodiment in which the second result is generated based on a modified first user input, displaying the second result in the workspace document at block 664 comprises displaying the second result in the workspace document while the modified first user input is also displaying in the workspace document.

In various embodiments, one of more of the blocks illustrated in FIG. 6 are omitted from the method 600, one or more of the blocks illustrated in FIG. 6 are modified, one or more additional blocks are added to the method 600, and/or the ordering of blocks in the method 600 is modified.

Embodiment 1: A method for interacting with an artificial intelligence (AI) computer processing system that processes information according to an AI algorithm, the method comprising: receiving, at one or more computer processors, a first user input to be processed by the AI computer processing system; in response to receiving the first user input, prompting, by the one or more computer processors, a display device to display the first user input in the workspace document; generating, at the one or more computer processors, a first application programming interface (API) call that includes the first user input, the first API call configured to prompt the AI computer processing system to process the first user input according to the AI algorithm; prompting, by the one or more computer processors, a network interface to send the first API call to the AI computer processing system; receiving, at the one or more computer processors, a first result from the AI computer processing system, the first result corresponding to a processing of the first user input by the AI computer processing system according to the AI algorithm, wherein receiving the first result is responsive to the network interface sending the first API call to the AI computer processing system; in response to receiving the first result, prompting, by the one or more computer processors, the display device to display the first result in the workspace document while displaying the first user input in the workspace document; after receiving the first result, receiving, at one or more computer processors, a second user input that corresponds to a modification of at least one of i) the first user input, and ii) the first result; in response to receiving the second user input, modifying in the workspace document, by the one or more computer processors, the one or both of i) the first user input and ii) the first result according to the second user input to generate one or both of i) a modified first user input and ii) a modified first result, and prompting, by the one or more computer processors, the display device to display the one or both of i) the modified first user input and ii) the modified first result in the workspace document; generating, at the one or more computer processors, a second API call that includes the one or both of i) the modified first user input and ii) the modified first result, the second API call configured to prompt the AI computer processing system to process the one or both of i) the modified first user input and ii) the modified first result according to the AI algorithm; prompting, by the one or more computer processors, the network interface to send the second API call to the AI computer processing system; receiving, at the one or more computer processors, a second result from the AI computer processing system, the second result corresponding to a processing of the one or both of i) the modified first user input and ii) the modified first result by the AI computer processing system according to the AI algorithm, wherein receiving the second result is responsive to the network interface sending the second API call to the AI computer processing system; and in response to receiving the second result, prompting, by the one or more computer processors, the display device to display the second result in the workspace document.

Embodiment 2: The method of embodiment 1, further comprising: receiving, at the one or more computer processors, a second user input that corresponds to adding a divider in the workspace document that divides a first section in the workspace document from a second section in the workspace document, wherein the first user input and the first result are located in the first section.

Embodiment 3: The method of embodiment 2, further comprising one or both of: in response to the divider in the workspace document, excluding, by the one or more computer processors, user input in the second section from being used for API calls generated using user input in the first section; and in response to the divider in the workspace document, excluding, by the one or more computer processors, user input in the first section from being used for API calls generated using user input in the second section.

Embodiment 4: The method of one of embodiments 2 and 3, further comprising: receiving, at the one or more computer processors, first configuration data for operation of the AI computer processing system in connection with the first section of the workspace document; receiving, at the one or more computer processors, second configuration data for operation of the AI computer processing system in connection with the second section of the workspace document; and one or both of: in response to the divider in the workspace document, excluding, by the one or more processors, the second configuration data from being used in connection with processing by the AI computer processing system of using user input in the first section, and in response to the divider in the workspace document, excluding, by the one or more processors, the first configuration data from being used in connection with processing by the AI computer processing system of using user input in the second section.

Embodiment 5: The method of any of embodiments 2-4, wherein the AI computer processing system is a first AI computer processing system, and wherein the method further comprises: receiving, at the one or more computer processors, first configuration data that indicates that the first section corresponds to the first AI computer processing system; receiving, at the one or more computer processors, second configuration data that indicates that the second section corresponds to a second AI computer processing system different than the first AI computer processing system; in response to the divider in the workspace document and the first configuration data, prompting, by the one or more computer processors, the network interface to send API calls corresponding to the first section to the first AI computer processing system; and in response to the divider in the workspace document and the second configuration data, prompting, by the one or more computer processors, the network interface to send API calls corresponding to the second section to the second AI computer processing system.

Embodiment 6: The method of any of embodiments 1-5, further comprising: in response to receiving the first result, storing, by the one or more computer processors, the first result in the workspace document while the first user input is stored in the workspace document.

Embodiment 7: The method of any of embodiments 1-6, wherein the second user input corresponds to a modification of the first user input, and wherein the second API call that includes a modified first user input, the method further comprising: in response to receiving the first result, prompting, by the one or more computer processors, the display device to display the first result in the workspace document while displaying the modified first user input in the workspace document.

Embodiment 8: A computer for interacting with an artificial intelligence (AI) computer processing system that processes information according to an AI algorithm, the computer comprising: one or more computer processors; and one or more memories coupled to the one or more computer processors. The one or more memories storing machine readable instructions that, when executed by the one or more processors, cause the one or more processors to: receive a first user input to be processed by the AI computer processing system; in response to receiving the first user input, prompt a display device to display the first user input in the workspace document; generate a first application programming interface (API) call that includes the first user input, the first API call configured to prompt the AI computer processing system to process the first user input according to the AI algorithm; prompt a network interface to send the first API call to the AI computer processing system; receive a first result from the AI computer processing system, the first result corresponding to a processing of the first user input by the AI computer processing system according to the AI algorithm, wherein receiving the first result is responsive to the network interface sending the first API call to the AI computer processing system; in response to receiving the first result, prompt the display device to display the first result in the workspace document while displaying the first user input in the workspace document; after receiving the first result, receive a second user input that corresponds to a modification of at least one of i) the first user input, and ii) the first result; in response to receiving the second user input, modify in the workspace document the one or both of i) the first user input and ii) the first result according to the second user input to generate one or both of i) a modified first user input and ii) a modified first result, and prompt the display device to display the one or both of i) the modified first user input and ii) the modified first result in the workspace document; generate a second API call that includes the one or both of i) the modified first user input and ii) the modified first result, the second API call configured to prompt the AI computer processing system to process the one or both of i) the modified first user input and ii) the modified first result according to the AI algorithm; prompt the network interface to send the second API call to the AI computer processing system; receive a second result from the AI computer processing system, the second result corresponding to a processing of the one or both of i) the modified first user input and ii) the modified first result by the AI computer processing system according to the AI algorithm, wherein receiving the second result is responsive to the network interface sending the second API call to the AI computer processing system; and in response to receiving the second result, prompt the display device to display the second result in the workspace document.

Embodiment 9: The computer of embodiment 8, wherein the one or more memories further store machine readable instructions that, when executed by the one or more processors, cause the one or more processors to: receive a second user input that corresponds to adding a divider in the workspace document that divides a first section in the workspace document from a second section in the workspace document, wherein the first user input and the first result are located in the first section.

Embodiment 10: The computer of embodiment 9, wherein the one or more memories further store machine readable instructions that, when executed by the one or more processors, cause the one or more processors to one or both of: in response to the divider in the workspace document, exclude user input in the second section from being used for API calls generated using user input in the first section; and in response to the divider in the workspace document, exclude user input in the first section from being used for API calls generated using user input in the second section.

Embodiment 11: The computer of one of embodiments 9 and 10, wherein the one or more memories further store machine readable instructions that, when executed by the one or more processors, cause the one or more processors to: receive first configuration data for operation of the AI computer processing system in connection with the first section of the workspace document; receive second configuration data for operation of the AI computer processing system in connection with the second section of the workspace document; and one or both of: in response to the divider in the workspace document, exclude the second configuration data from being used in connection with processing by the AI computer processing system of using user input in the first section, and in response to the divider in the workspace document, exclude the first configuration data from being used in connection with processing by the AI computer processing system of using user input in the second section.

Embodiment 12: The computer of any of embodiments 9-11, wherein the AI computer processing system is a first AI computer processing system, and wherein the one or more memories further store machine readable instructions that, when executed by the one or more processors, cause the one or more processors to: receive first configuration data that indicates that the first section corresponds to the first AI computer processing system; receive second configuration data that indicates that the second section corresponds to a second AI computer processing system different than the first AI computer processing system; in response to the divider in the workspace document and the first configuration data, prompt the network interface to send API calls corresponding to the first section to the first AI computer processing system; and in response to the divider in the workspace document and the second configuration data, prompt the network interface to send API calls corresponding to the second section to the second AI computer processing system.

Embodiment 13: The computer of any of embodiments 8-12, wherein the one or more memories further store machine readable instructions that, when executed by the one or more processors, cause the one or more processors to: in response to receiving the first result, store the first result in the workspace document while the first user input is stored in the workspace document.

Embodiment 14: The computer of any of embodiments 8-13, wherein the second user input corresponds to a modification of the first user input, wherein the second API call that includes a modified first user input, and wherein the one or more memories further store machine readable instructions that, when executed by the one or more processors, cause the one or more processors to: in response to receiving the first result, prompt the display device to display the first result in the workspace document while displaying the modified first user input in the workspace document.

Embodiment 15: One or more tangible, non-transitory computer readable media storing machine readable instructions that, when executed by one or more processors, cause the one or more processors to: receive a first user input to be processed by the AI computer processing system; in response to receiving the first user input, prompt a display device to display the first user input in the workspace document; generate a first application programming interface (API) call that includes the first user input, the first API call configured to prompt the AI computer processing system to process the first user input according to the AI algorithm; prompt a network interface to send the first API call to the AI computer processing system; receive a first result from the AI computer processing system, the first result corresponding to a processing of the first user input by the AI computer processing system according to the AI algorithm, wherein receiving the first result is responsive to the network interface sending the first API call to the AI computer processing system; in response to receiving the first result, prompt the display device to display the first result in the workspace document while displaying the first user input in the workspace document; after receiving the first result, receive a second user input that corresponds to a modification of at least one of i) the first user input, and ii) the first result; in response to receiving the second user input: modify in the workspace document the one or both of i) the first user input and ii) the first result according to the second user input to generate one or both of i) a modified first user input and ii) a modified first result, and prompt the display device to display the one or both of i) the modified first user input and ii) the modified first result in the workspace document; generate a second API call that includes the one or both of i) the modified first user input and ii) the modified first result, the second API call configured to prompt the AI computer processing system to process the one or both of i) the modified first user input and ii) the modified first result according to the AI algorithm; prompt the network interface to send the second API call to the AI computer processing system; receive a second result from the AI computer processing system, the second result corresponding to a processing of the one or both of i) the modified first user input and ii) the modified first result by the AI computer processing system according to the AI algorithm, wherein receiving the second result is responsive to the network interface sending the second API call to the AI computer processing system; and in response to receiving the second result, prompt the display device to display the second result in the workspace document.

Embodiment 16: The one or more computer readable media of embodiment 15, further storing machine readable instructions that, when executed by the one or more processors, cause the one or more processors to: receive a second user input that corresponds to adding a divider in the workspace document that divides a first section in the workspace document from a second section in the workspace document, wherein the first user input and the first result are located in the first section.

Embodiment 17: The one or more computer readable media of embodiment 16, further storing machine readable instructions that, when executed by the one or more processors, cause the one or more processors to: in response to the divider in the workspace document, exclude user input in the second section from being used for API calls generated using user input in the first section; and in response to the divider in the workspace document, exclude user input in the first section from being used for API calls generated using user input in the second section.

Embodiment 18: The one or more computer readable media of one of embodiments 16 or 17, further storing machine readable instructions that, when executed by the one or more processors, cause the one or more processors to: receive first configuration data for operation of the AI computer processing system in connection with the first section of the workspace document; receive second configuration data for operation of the AI computer processing system in connection with the second section of the workspace document; and one or both of: in response to the divider in the workspace document, exclude the second configuration data from being used in connection with processing by the AI computer processing system of using user input in the first section, and in response to the divider in the workspace document, exclude the first configuration data from being used in connection with processing by the AI computer processing system of using user input in the second section.

Embodiment 19: The one or more computer readable media of any of embodiments 16-18, wherein the AI computer processing system is a first AI computer processing system, and wherein the one or more memories further store machine readable instructions that, when executed by the one or more processors, cause the one or more processors to: receive first configuration data that indicates that the first section corresponds to the first AI computer processing system; receive second configuration data that indicates that the second section corresponds to a second AI computer processing system different than the first AI computer processing system; in response to the divider in the workspace document and the first configuration data, prompt the network interface to send API calls corresponding to the first section to the first AI computer processing system; and in response to the divider in the workspace document and the second configuration data, prompt the network interface to send API calls corresponding to the second section to the second AI computer processing system.

Embodiment 20: The one or more computer readable media of any of embodiments 15-19, further storing machine readable instructions that, when executed by the one or more processors, cause the one or more processors to: in response to receiving the first result, store the first result in the workspace document while the first user input is stored in the workspace document.

Embodiment 21: The one or more computer readable media of any of embodiments 15-20, wherein the second user input corresponds to a modification of the first user input, wherein the second API call that includes a modified first user input, and wherein the one or more memories further store machine readable instructions that, when executed by the one or more processors, cause the one or more processors to: in response to receiving the first result, prompt the display device to display the first result in the workspace document while displaying the modified first user input in the workspace document.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or the phrase "in an embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

At least some of the various blocks, operations, and techniques described above may be implemented utilizing hardware, a processor executing firmware instructions, a processor executing software instructions, or any combination thereof. When implemented in hardware, the hardware may comprise one or more of discrete components, an integrated circuit, an ASIC, a programmable logic device, etc. When implemented utilizing a processor executing software or firmware instructions, the software or firmware instructions may be stored in any tangible, non-transitory computer readable medium or media such as a magnetic disk, an optical disk, a tape drive, a RAM, a ROM, a flash memory, a memory of a processor, etc. Likewise, the software or firmware instructions may be delivered to a user or a system via any known or desired delivery method including, for example, on a tangible, non-transitory computer readable medium or media, or via communication media. The software or firmware instructions may include machine readable instructions that, when executed by the processor, cause the processor to perform various acts.

Upon reading this disclosure, those of skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for interacting with a first artificial intelligence (AI) computer processing system that processes information according to an AI algorithm, the method comprising:

receiving, at one or more computer processors, a first user input to be processed by the first AI computer processing system;

in response to receiving the first user input, prompting, by the one or more computer processors, a display device to display the first user input in a workspace document;

generating, at the one or more computer processors, a first application programming interface (API) call that includes the first user input, the first API call configured to prompt the first AI computer processing system to process the first user input according to the AI algorithm;

prompting, by the one or more computer processors, a network interface to send the first API call to the first AI computer processing system;

receiving, at the one or more computer processors, a first result from the first AI computer processing system, the first result corresponding to a processing of the first user input by the first AI computer processing system according to the AI algorithm, wherein receiving the first result is responsive to the network interface sending the first API call to the first AI computer processing system;

in response to receiving the first result, prompting, by the one or more computer processors, the display device to display the first result in the workspace document while displaying the first user input in the workspace document;

after receiving the first result, receiving, at one or more computer processors, a second user input that corresponds to a modification of at least one of i) the first user input, and ii) the first result;

in response to receiving the second user input, modifying in the workspace document, by the one or more computer processors, the one or both of i) the first user input and ii) the first result according to the second user input to generate one or both of i) a modified first user input and ii) a modified first result, and prompting, by the one or more computer processors, the display device to display the one or both of i) the modified first user input and ii) the modified first result in the workspace document;

generating, at the one or more computer processors, a second API call that includes the one or both of i) the modified first user input and ii) the modified first result, the second API call configured to prompt the first AI computer processing system to process the one or both of i) the modified first user input and ii) the modified first result according to the AI algorithm;

prompting, by the one or more computer processors, the network interface to send the second API call to the first AI computer processing system;

receiving, at the one or more computer processors, a second result from the first AI computer processing system, the second result corresponding to a processing of the one or both of i) the modified first user input and ii) the modified first result by the first AI computer processing system according to the AI algorithm, wherein receiving the second result is responsive to the network interface sending the second API call to the first AI computer processing system;

in response to receiving the second result, prompting, by the one or more computer processors, the display device to display the second result in the workspace document;

receiving, at the one or more, processors, first configuration data that indicates that a first section in the workspace document corresponds to the first AI computer processing system, the first section divided from a second section in the workspace document by a divider in the workspace document, receiving, at the one or more computer processor second configuration data that indicates that the second section corresponds to a second AI computer processing system different than the first AI computer processing system, in response to the divider in the workspace document and the first configuration data, prompting, by the one or more computer processors, the netowrk interface to send API calls corresponding to the first section to the first AI computer processing system; and in response to the divider in the workspace document and the second configuration data, prompting, by the one or more computer processors, the network ix to send API calls corresponding to the second section to the second AI computer processing system.

2. The method of claim 1, further comprising:

receiving, at the one or more computer processors, a third user input that corresponds to adding the divider in the workspace document to divide the first section in the workspace document from the second section in the workspace document, wherein the first user input and the first result are located in the first section.

3. The method of claim 2, further comprising one or both of:

in response to the divider in the workspace document, excluding, by the one or more computer processors, user input in the second section from being used for API calls generated using user input in the first section; and in response to the divider in the workspace document, excluding, by the one or more computer processors, user input in the first section from being used for API calls generated using user input in the second section.

4. The method of claim 2, further comprising:

receiving, at the one or more computer processors, third configuration data for operation of the first AI computer processing system in connection with the first section of the workspace document;

receiving, at the one or more computer processors, fourth configuration data for operation of the second AI computer processing system in connection with the second section of the workspace document; and one or both of:

in response to the divider in the workspace document, excluding, by the one or more processors, the second configuration data from being used in connection with processing by the first AI computer processing system of using user input in the first section, and in response to the divider in the workspace document, excluding, by the one or more processors, the first configuration data from being used in connection with processing by the second AI computer processing system of using user input in the second section.

5. The method of claim 1, further comprising:

in response to receiving the first result, storing, by the one or more computer processors, the first result in the workspace document while the first user input is stored in the workspace document.

6. The method of claim 1, wherein the second user input corresponds to a modification of the first user input, and wherein the second API call that includes a modified first user input, the method further comprising:

in response to receiving the first result, prompting, by the one or more computer processors, the display device to display the first result in the workspace document while displaying the modified first user input in the workspace document.

7. A computer for interacting with a first artificial intelligence (AI) computer processing system that processes information according to an AI algorithm, the computer comprising:

one or more computer processors; and one or more memories coupled to the one or more computer processors, the one or more memories storing machine readable instructions that, when executed by the one or more processors, cause the one or more processors to:

receive a first user input to be processed by the first AI computer processing system, in response to receiving the first user input, prompt a display device to display the first user input in a workspace document, generate a first application programming interface (API) call that includes the first user input, the first API call configured to prompt the first AI computer processing system to process the first user input according to the AI algorithm, prompt a network interface to send the first API call to the first AI computer processing system, receive a first result from the first AI computer processing system, the first result corresponding to a processing of the first user input by the first AI computer processing system according to the AI algorithm, wherein receiving the first result is responsive to the network interface sending the first API call to the first AI computer processing system, in response to receiving the first result, prompt the display device to display the first result in the workspace document while displaying the first user input in the workspace document, after receiving the first result, receive a second user input that corresponds to a modification of at least one of i) the first user input, and ii) the first result, and in response to receiving the second user input, modify in the workspace document the one or both of i) the first user input and ii) the first result according to the second user input to generate one or both of i) a modified first user input and ii) a modified first result, and prompt the display device to display the one or both of i) the modified first user input and ii) the modified first result in the workspace document;

wherein the one or more memories further store machine readable instructions that, when executed by the one or more processors, cause the one or more processors to:

generate a second API call that includes the one or both of i) the modified first user input and ii) the modified first result, the second API call configured to prompt the first AI computer processing system to process the one or both of i) the modified first user input and ii) the modified first result according to the AI algorithm, prompt the network interface to send the second API call to the first AI computer processing system, receive a second result from the first AI computer processing system, the second result corresponding to a processing of the one or both of i) the modified first user input and ii) the modified first result by the first AI computer processing system according to the AI algorithm, wherein receiving the second result is responsive to the network interface sending the second API call to the first AI computer processing system, in response to receiving the second result, prompt the display device to display the second result in the workspace document, receive first configuration data that indicates that a first section in the workspace document corresponds to the first AI computer processing system, the first section divided from a second section in the workspace document by er in the workspace document, receive second configuration data that indicates that the second section corresponds a second AI computer processing system different than the first AI computer processing system;

in response to the divider in the workspace document and the first configuration data, prompt the network interface to send API calls corresponding to the first section to the first AI computer processing system, and in response to the divider in the workspace document and the second configuration data, prompt the network interface to send API calls corresponding to the second section to the second AI computer processing system.

8. The computer of claim 7, wherein the one or more memories further store machine readable instructions that, when executed by the one or more processors, cause the one or more processors to:

receive a third user input that corresponds to adding the divider in the workspace document to divide the first section in the workspace document from the second section in the workspace document, wherein the first user input and the first result are located in the first section.

9. The computer of claim 8, wherein the one or more memories further store machine readable instructions that, when executed by the one or more processors, cause the one or more processors to one or both of:

in response to the divider in the workspace document, exclude user input in the second section from being used for API calls generated using user input in the first section; and in response to the divider in the workspace document, exclude user input in the first section from being used for API calls generated using user input in the second section.

10. The computer of claim 8, wherein the one or more memories further store machine readable instructions that, when executed by the one or more processors, cause the one or more processors to:

receive third configuration data for operation of the first AI computer processing system in connection with the first section of the workspace document;

receive fourth configuration data for operation of the second AI computer processing system in connection with the second section of the workspace document; and one or both of:

in response to the divider in the workspace document, exclude the second configuration data from being used in connection with processing by the first AI computer processing system of using user input in the first section, and in response to the divider in the workspace document, exclude the first configuration data from being used in connection with processing by the second AI computer processing system of using user input in the second section.

11. The computer of claim 7, wherein the one or more memories further store machine readable instructions that, when executed by the one or more processors, cause the one or more processors to:

in response to receiving the first result, store the first result in the workspace document while the first user input is stored in the workspace document.

12. The computer of claim 7, wherein the second user input corresponds to a modification of the first user input, wherein the second API call that includes a modified first user input, and wherein the one or more memories further store machine readable instructions that, when executed by the one or more processors, cause the one or more processors to:

in response to receiving the first result, prompt the display device to display the first result in the workspace document while displaying the modified first user input in the workspace document.

13. One or more tangible, non-transitory computer readable media storing machine readable instructions that, when executed by one or more processors, cause the one or more processors to:

receive a first user input to be processed by a first artificial intelligence (AD) computer processing system;

in response to receiving the first user input, prompt a display device to display the first user input in a workspace document;

generate a first application programming interface (API) call that includes the first user input, the first API call configured to prompt the first AI computer processing system to process the first user input according to the AI algorithm;

prompt a network interface to send the first API call to the first AI computer processing system;

receive a first result from the first AI computer processing system, the first result corresponding to a processing of the first user input by the first AI computer processing system according to the AI algorithm, wherein receiving the first result is responsive to the network interface sending the first API call to the first AI computer processing system;

in response to receiving the first result, prompt the display device to display the first result in the workspace document while displaying the first user input in the workspace document;

after receiving the first result, receive a second user input that corresponds to a modification of at least one of i) the first user input, and ii) the first result;

in response to receiving the second user input:

modify in the workspace document the one or both of i) the first user input and ii) the first result according to the second user input to generate one or both of i) a modified first user input and ii) a modified first result, and prompt the display device to display the one or both of i) the modified first user input and ii) the modified first result in the workspace document;

generate a second API call that includes the one or both of i) the modified first user input and ii) the modified first result, the second API call configured to prompt the first AI computer processing system to process the one or both of i) the modified first user input and ii) the modified first result according to the AI algorithm;

prompt the network interface to send the second API call to the first AI computer processing system;

receive a second result from the first AI computer processing system, the second result corresponding to a processing of the one or both of i) the modified first user input and ii) the modified first result by the first AI computer processing system according to the AI algorithm, wherein receiving the second result is responsive to the network interface sending the second API call to the first AI computer processing system;

in response to receiving the second result, prompt the display device to display the second result in the workspace document, receive first configuration data that indicates that a first section in the workspace document corresponds to the first AI computer processing system, the first section divided from second section in the workspace document by a divider in the workspace document;

receive second configuration data that indicates that the second section corresponds to a second AI computer processing system different than the first AI computer processing system, in response to the divider in the workspace document and the first configuration data, prompt the network interface to send API corresponding to the first section to the first AI computer processing system; and in response e divider in the workspace document and the second configuration data prompt the network interface to send API calls corresponding to the second section to the second AI computer processing system.

14. The one or more computer readable media of claim 13, further storing machine readable instructions that, when executed by the one or more processors, cause the one or more processors to:

receive a third user input that corresponds to adding the divider in the workspace document to divide the first section in the workspace document from the second section in the workspace document, wherein the first user input and the first result are located in the first section.

15. The one or more computer readable media of claim 14, further storing machine readable instructions that, when executed by the one or more processors, cause the one or more processors to:

in response to the divider in the workspace document, exclude user input in the second section from being used for API calls generated using user input in the first section; and in response to the divider in the workspace document, exclude user input in the first section from being used for API calls generated using user input in the second section.

16. The one or more computer readable media of claim 14, further storing machine readable instructions that, when executed by the one or more processors, cause the one or more processors to:

receive third configuration data for operation of the first AI computer processing system in connection with the first section of the workspace document;

receive fourth configuration data for operation of the second AI computer processing system in connection with the second section of the workspace document; and one or both of:

in response to the divider in the workspace document, exclude the second configuration data from being used in connection with processing by the first AI computer processing system of using user input in the first section, and in response to the divider in the workspace document, exclude the first configuration data from being used in connection with processing by the second AI computer processing system of using user input in the second section.

17. The one or more computer readable media of claim 13, further storing machine readable instructions that, when executed by the one or more processors, cause the one or more processors to:

in response to receiving the first result, store the first result in the workspace document while the first user input is stored in the workspace document.

18. The one or more computer readable media of claim 13, wherein the second user input corresponds to a modification of the first user input, wherein the second API call that includes a modified first user input, and wherein the one or more memories further store machine readable instructions that, when executed by the one or more processors, cause the one or more processors to:

in response to receiving the first result, prompt the display device to display the first result in the workspace document while displaying the modified first user input in the workspace document.

* * * * *